United States Patent
Zhang et al.

(10) Patent No.: US 11,855,735 B2
(45) Date of Patent: Dec. 26, 2023

(54) TECHNOLOGIES FOR BEAM FAILURE RECOVERY

(71) Applicant: Apple Inc., Cupertino, CA (US)

(72) Inventors: Yushu Zhang, Beijing (CN); Chunxuan Ye, San Diego, CA (US); Weidong Yang, San Diego, CA (US); Sigen Ye, Whitehouse Station, NJ (US); Oghenekome Oteri, San Diego, CA (US); Jie Cui, San Jose, CA (US); Haitong Sun, Cupertino, CA (US); Wei Zeng, Saratoga, CA (US); Hong He, San Jose, CA (US); Dawei Zhang, Saratoga, CA (US); Chunhai Yao, Beijing (CN); Huaning Niu, San Diego, CA (US)

(73) Assignee: Apple Inc., Cupertino, CA (US)

( * ) Notice: Subject to any disclaimer, the term of this patent is extended or adjusted under 35 U.S.C. 154(b) by 174 days.

(21) Appl. No.: 17/440,181

(22) PCT Filed: Oct. 14, 2020

(86) PCT No.: PCT/CN2020/120903
§ 371 (c)(1),
(2) Date: Sep. 16, 2021

(87) PCT Pub. No.: WO2022/077269
PCT Pub. Date: Apr. 21, 2022

(65) Prior Publication Data
US 2022/0352958 A1  Nov. 3, 2022

(51) Int. Cl.
| | |
|---|---|
| H04B 7/06 | (2006.01) |
| H04W 74/08 | (2009.01) |
| H04W 76/19 | (2018.01) |
| H04W 80/02 | (2009.01) |
| H04W 36/06 | (2009.01) |
| H04W 36/30 | (2009.01) |
| H04W 84/06 | (2009.01) |

(52) U.S. Cl.
CPC ...... *H04B 7/0695* (2013.01); *H04W 74/0841* (2013.01); *H04W 76/19* (2018.02); *H04W 80/02* (2013.01)

(58) Field of Classification Search
CPC ............ H04B 7/0695; H04W 74/0841; H04W 76/19; H04W 80/02; H04W 36/06; H04W 36/305; H04W 84/06; Y02D 30/70
See application file for complete search history.

(56) References Cited

U.S. PATENT DOCUMENTS

2019/0253949 A1    8/2019  Park et al.
2019/0319833 A1*  10/2019  Nagaraja ................. H04L 5/001
(Continued)

FOREIGN PATENT DOCUMENTS

CN           110326320          10/2019

OTHER PUBLICATIONS

Beam Failure Recovery for SCell with New Beam Information, Huawei, 3GPP TSG RAN WG1 Meeting #97, R1-1907533, May 13, 2019, 7 pages.

(Continued)

*Primary Examiner* — Harry H Kim
(74) *Attorney, Agent, or Firm* — Kilpatrick Townsend & Stockton LLP

(57) ABSTRACT

The present application relates to devices and components including apparatus, systems, and methods for beam failure recovery operations in wireless communication systems.

20 Claims, 10 Drawing Sheets

(56) References Cited

U.S. PATENT DOCUMENTS

2020/0305169 A1* 9/2020 Loehr ............... H04W 28/0278
2021/0013950 A1* 1/2021 Yang ..................... H04W 72/53
2021/0314021 A1* 10/2021 Sakhnini ................ H04L 5/006
2022/0053590 A1* 2/2022 Ma ....................... H04B 7/0695
2022/0109489 A1* 4/2022 Zhu ....................... H04L 1/1896
2022/0240326 A1* 7/2022 Rune ................ H04W 74/0866
2022/0338249 A1* 10/2022 Lei ........................ H04W 24/08

OTHER PUBLICATIONS

International Patent Application No. PCT/CN2020/120903, International Search Report and Written Opinion, dated Jul. 21, 2021, 9 pages.
3rd Generation Partnership Project; Technical Specification Group Radio Access Network; NR; Physical layer procedures for control (Release 16), 3GPP TS 38.213 V16.3.0, Sep. 2020, 179 pages.
3rd Generation Partnership Project; Technical Specification Group Radio Access Network; NR; Medium Access Control (MAC) protocol specification (Release 16), 3GPP TS 38.321 V16.2.1, Sep. 2020, 154 pages.
3rd Generation Partnership Project; Technical Specification Group Radio Access Network; NR; Radio Resource Control (RRC) protocol specification (Release 16), 3GPP TS 38.331 V16.2.0, Sep. 2020, 921 pages.
International Patent Application No. PCT/CN2020/120903, International Preliminary Report on Patentability, dated Apr. 27, 2023, 6 pages.

* cited by examiner

TECHNOLOGIES FOR BEAM FAILURE RECOVERY

CROSS REFERENCES TO RELATED APPLICATIONS

This application is the U.S. National Phase of PCT Application No. PCT/CN2020/120903, filed Oct. 14, 2020, the disclosure of which is incorporated by reference in its entirety.

BACKGROUND

Beam failure recovery techniques are described in existing Third Generation Partnership Project (3GPP) networks. These techniques include detecting a beam failure, finding and selecting a new beam, and recovering a connection.

DETAILED DESCRIPTION

Figure 1:
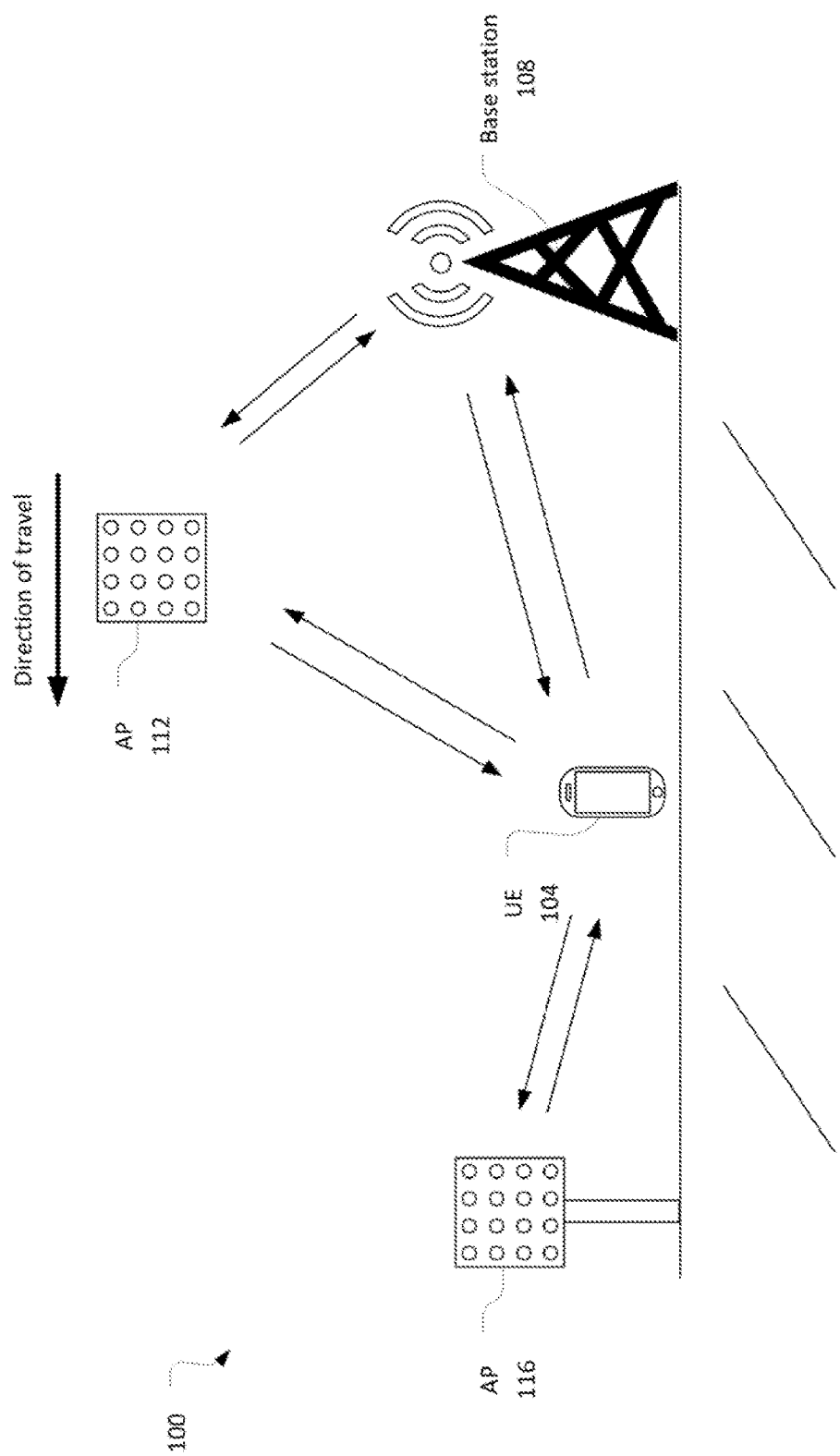
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 and a base station 108. The base station 108 may provide one or more wireless serving cells, for example, 3GPP New Radio "NR" cells, through which the UE 104 may communicate with the base station 108. In some embodiments, the serving cells may be divided into a master cell group (MCG) and a secondary cell group (SCG), each having a primary serving cell and, potentially, one or more secondary serving cells. A primary serving cell of the MCG may be referred to as PCell and a secondary serving cell of the MCG may be referred to as an SSCell. A primary serving cell of the SCG may be referred to as PSCell and a secondary serving cell of the SCG may be referred to as an SSCell. Reference to a primary serving cell includes both PCell and PSCell and reference to a secondary serving cell includes both SCell and SSCell unless otherwise indicated.

The UE 104 and the base station 108 may communicate over an air interface compatible with 3GPP technical specifications such as those that define Fifth Generation (5G) NR system standards. The base station 108 may be a next-generation-radio access network (NG-RAN) node that is coupled with a 5G core network. An NG-RAN node may be either a gNB to provide an NR user plane and control plane protocol terminations toward the UE 104 or an ng-eNB to provide evolved universal terrestrial radio access (E-UTRA) user plane and control plane protocol terminations toward the UE 104.

The base station 108 may be coupled with one or more distributed antenna panels APs, for example, APs 112 and 116. In general, the base station 108 may perform the majority of the operations of a communication protocol stack, while the TRPs 112/116 act as distributed antennas. In some embodiments, the TRPs 112/116 may perform some lower-level operations of the communication protocol stack (for example, analog physical (PHY) layer operations). The base station 108 may be coupled with the TRPs 112/116 through a wired or wireless backhaul connection. In some embodiments, the antenna panels may be implemented in respective transmit-receive points.

The base station 108 may use APs 112/116 to geographically separate points at which a signal may be transmitted to, or received from, the UE 104. This may increase flexibility of using multiple-input, multiple-output and beamforming enhancements for communicating with the UE 104. The APs 112/116 may be used to transmit downlink transmissions to the UE 104 and receive uplink transmissions from the UE 104. In some embodiments, the distributed transmit/receive capabilities provided by the APs 112/116 may be used for coordinated multipoint or carrier aggregation systems.

In some embodiments, the network environment 100 may include at least one of the APs 112/116 implemented as a non-terrestrial AP, in which case the network environment 100 may be referred to as a non-terrestrial network (NTN). As shown, AP 112 may be considered a non-terrestrial AP while AP 116 may be considered a terrestrial AP. The non-terrestrial AP 112 may be capable of moving relative to geographical location, typically on fixed or predetermined routes. For example, the non-terrestrial AP 112 may be provided by unmanned aerial vehicles, airplanes, satellites of various altitude classifications (for example, low-earth orbit, medium-earth orbit, geosynchronous earth orbit, or high-earth orbit), etc. Some embodiments may include mobile terrestrial APs such as, for example, APs provided by vehicles, trains, etc. in a similar manner. In embodiments in which the AP 112 is a non-terrestrial AP provided by a satellite, the backhaul connection to the base station 108 may be provided through an NTN gateway coupled with the base station 108 via a high-speed connection, for example, an Ethernet connection.

Figure 2:
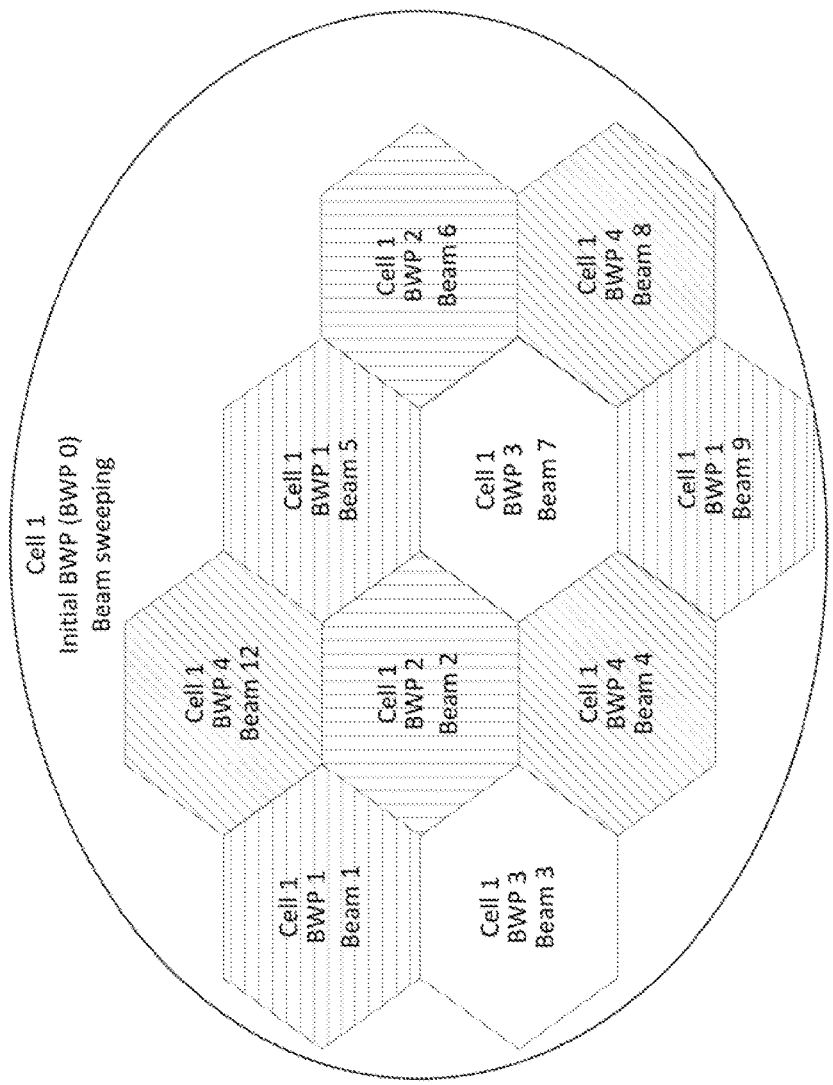
FIG. 2 is a plan view of cell coverage in accordance with some embodiments.

Incorporating mobile or non-terrestrial APs into the network environment 100 may facilitate provision of a number of different beams within a physical cell. The cell coverage within the physical cell may leverage the number of beams to increase desired connectivity throughout a relatively large geographical range. FIG. 2 illustrates a plan view of cell coverage 200 in accordance with some embodiments. The base station 108 and the APs 112/116 may provide the cell coverage 200 with different beams applied to different bandwidth parts (BWPs). In some embodiments, each AP 112/116 may provide a respective cell, in which case the cell coverage 200 may be provided by only one AP. In other embodiments, the APs 112/116 may cooperatively provide a cell, in which case, the cell coverage 200 may be provided by both APs 112 and 116.

A BWP is a set of common resource blocks that span some, or all, of the channel bandwidth. The UE 104 may be configured with a plurality of BWPs per component carrier. A different number of BWPs may be configured for the uplink or the downlink. In some embodiments, up to four BWPs may be configured per carrier. Typically, only a single BWP is active per carrier per direction. This may be referred to as the active BWP. The UE 104 may receive a physical downlink channel transmission (for example, a physical downlink control channel (PDCCH) or physical downlink shared channel (PDSCH)) within an active downlink BWP and transmit a physical uplink channel transmission (for example, a physical uplink control channel (PUCCH) or a physical uplink shared channel (PUSCH)) within the active uplink BWP.

The UE 104 may determine initial uplink/downlink BWPs when initially accessing a serving cell. The initial uplink/downlink BWPs may be signaled through system information block 1 or dedicated signaling. The initial downlink BWP may be provided by an initialDownlinkBWP parameter. If such a parameter is not provided, the UE 104 may determine the initial downlink based on a set of resource blocks that belong to a control resource (CORE-SET) for a Type 0 PDCCH and search space. The set of resource blocks may be determined based on information within a master information block.

In some embodiments, the BWP may be a default BWP. In some embodiments, the base station 108 may configure the UE 104 with a default BWP using, for example, a defaultDownlinkBWP-ID. This default BWP ID may be one of the identifiers configured with the initial BWP configuration. In operation, the UE 104 may transition from an active BWP to the default BWP upon expiration of a BWP inactivity timer. If a default downlink BWP is not configured, the UE 104 may use the initial downlink BWP as the default BWP.

Cell coverage 200 includes an initial BWP (BWP 0) in which beam sweeping is performed. The base station 108 may cause a plurality of synchronization signal blocks (SSBs) to be transmitted in BWP 0 through a corresponding plurality of beams. Measurements reported to the base station 108 from the UE 104 on these SSBs may then be used to select a desired beam or beams for the UE 104 or for other beam management operations.

Cell coverage 200 may further include four other BWPs. BWP 1 may be provided with beam 1, beam 5, and beam 9. BWP 2 may be provided with beam 2 and beam 6. BWP 3 may be provided with beam 3 and beam 7. And BWP 4 may be provided with beam 4, beam 8, and beam 12. The base station 108 may address inter-beam interference by configuring the cell coverage 200 in a manner to maintain orthogonality between bandwidth for adjacent BWPs. For example, BWPs provided by different beams may not be adjacent to one another to mitigate inter-beam interference.

The base station 108 may configure the UE 104 to perform various beam failure recovery (BFR) operations to detect a change in radio conditions that may cause existing beams to be unreliable. These beam failure recovery operations may be provided by lower layers of the UE 104, for example, physical (PHY) layer and media access control (MAC) layer, in order to quickly detect a beam failure, select a new beam, and recover a connection. In Release 15 of 3GPP, all BFR procedures were completed within one BWP. However, such operation may not properly leverage or account for the cell coverage 200 that may be provided by networks employing mobile or non-terrestrial APs such as the network environment 100.

Embodiments of this disclosure provide control signaling and UE behavior to support BFR operation in network environments that may employee mobile or non-terrestrial APs. In particular, embodiments describe control signaling and UE behavior for BFR operation aspects including, for example, candidate beam detection (CBD), beam failure recovery request (BFRQ), and beam failure recover response (BFRR). The control signaling and UE behavior for CBD may provide that different beams could be transmitted in different BWPs. The control signaling UE behavior for BFRQ may provide that the BFRQ is to be transmitted in a different BWP. The control signaling and UE behavior for BFRR may provide that the BFRR may also be carried in a different BWP and may further provide the UE behavior for BWP and beams after receiving the BFRR.

Figure 3:
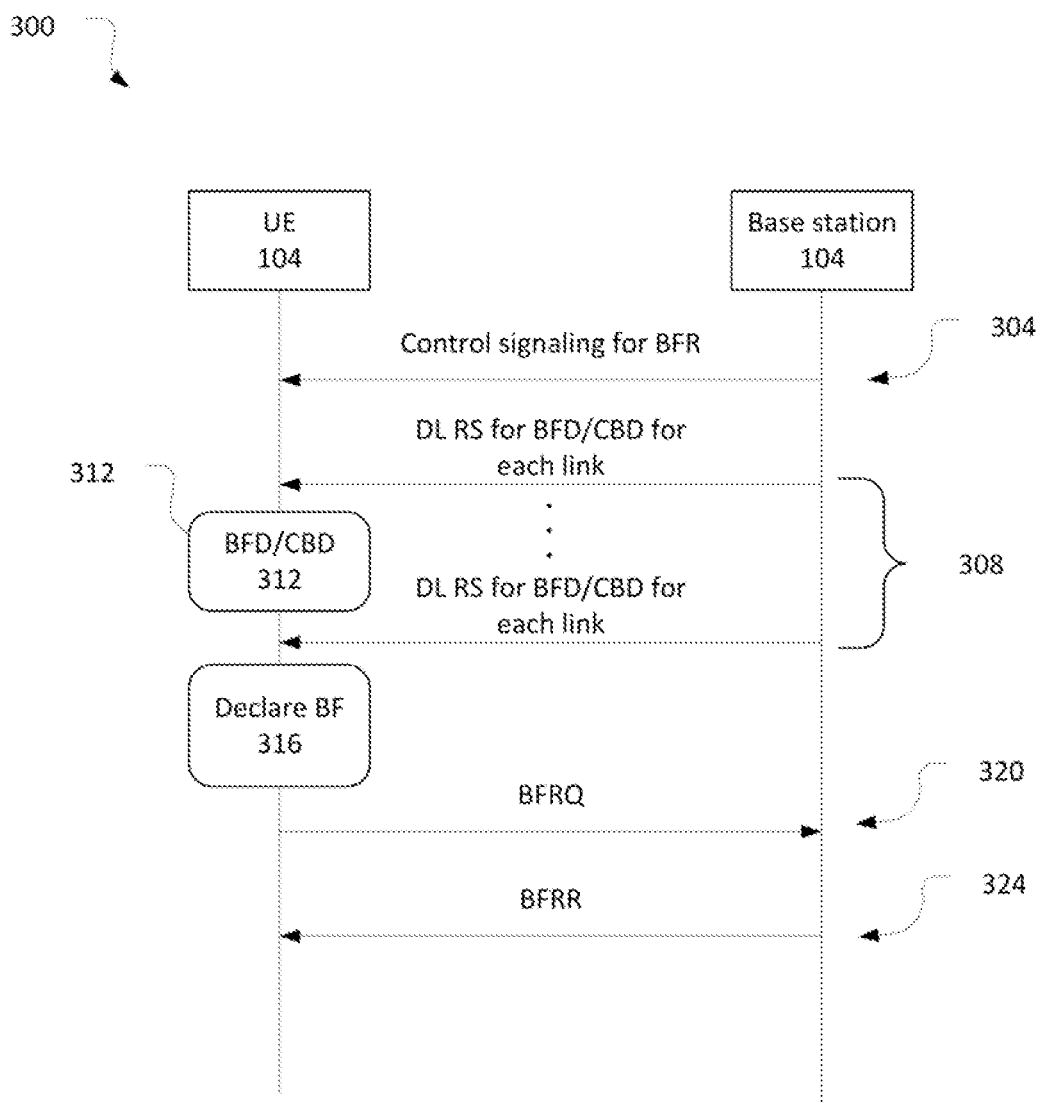
FIG. 3 illustrates beam failure recovery operation in accordance with some embodiments.

FIG. 3 illustrates a BFR operation 300 in accordance with some embodiments.

The BFR operation 300 may include, at 304, the base station 108 transmitting control signaling for the BFR 300. In some embodiments, the control signaling may configure a set of reference signals (RSs) for the UE 104 to measure for the BFR operation 300. For example, the base station 108 may use a RadioLinkMonitoringRS to configure a set of RSs for the UE 104. These may be referred to as beam failure detection (BFD) RSs and may include, for example, channel state information-reference signals (CSI-RS) or synchronization signal blocks (SSB).

In some embodiments, the UE 104 may not be specifically configured with BFD RSs, for example, may not be provided RadioLinkMonitoringRS. In these embodiments, the UE 104 may determine which RSs to use as BFD RSs based on other information. For example, the UE 104 may use a reference signal provided for an active transmission configuration indicator (TCI) state for PDCCH reception as the BFD RS if the active TCI state for PDCCH reception includes only one reference signal.

The control signaling transmitted at 304 may additionally/alternatively configure reference signals for candidate beam detection (CBD). These may be referred to as CBD RSs. Similar to the BFD RSs, the CB RSs may include SSBs or CSI-RSs.

The control signaling transmitted at 304 may additionally/alternatively configure other resources that may be used for measuring candidate beams, reporting a BFRQ, or receiving a BFRR as will be described herein.

The BFR 300 may further include, at 308, transmitting the downlink reference signals for BFD/CBD for each link. These reference signals may be transmitted periodically, aperiodically, or based on a trigger event. The downlink reference signals for BFD/CBD may be transmitted directly by the base station 108 or through APs 112/116. The BFD RSs may be transmitted in all the BWPs. The CBD RSs may be transmitted in one or more of the BWPs as described further herein.

The BFR 300 may include, at 312, performing the BFD and the CBD based on respective downlink reference signals.

The BFD may include the PHY layer (which may also be referred to as Layer 1 (L1)) receiving and measuring the BFD-RSs. The BFD-RS may be quasi-co-located with a PDCCH in an active bandwidth part. The PHY layer may generate a beam failure instance if a radio link quality of the BFD-RS falls below a quality level ($Q_{out\_LR}$), which may correspond to a quality at which a block error rate (BLER) for a hypothetical PDCCH transmission is 10%. The PHY layer may provide the beam failure instance to MAC layer. The MAC layer may evaluate conditions for beam failure based on the beam failure instances received from the PHY layer. If conditions warrant, the MAC layer may declare beam failure (BF) at 316. In some embodiments, the MAC layer may declare BF when the BFD-RS is below the quality threshold level a predetermined number of times in a predetermined time period.

For example, in some embodiments the MAC layer may include a beam failure instance (BFI) counter that starts at zero and increments every time the MAC layer receives an indication of a beam failure instance from the PHY layer. The MAC layer may also restart a beam failure detection timer upon receiving a beam failure instance. If the beam failure detection timer expires, the counter may be reset to zero. The MAC layer may declare a beam failure if the BFI counter becomes greater than or equal to a predetermined BFI maximum value while the timer is running.

The UE 104 may perform the CBD by measuring CBD RSs from a new beam and selecting a beam associated with an L1 reference signal receive power (RSRP) above a respective threshold. In some embodiments, the UE 104 may be configured with a list of up to 16 SSB or CSI-RS beams that may be candidate beams. The list may be provided in an RRC parameter such as, for example, a candidate-BeamRSList, provided by the base station 108. If the CBD-RS is an SSB, the threshold may correspond to rsrp-ThresholdSSB. If the CBD-RS is a CSI-RS, the threshold may correspond to rsrp-ThresholdSSB+powerControlOffsetSS.

The BFR 300 may include, at 320, the UE 104 sending the BFRQ to the base station 108. The BFRQ may inform the base station 108 of the beam failure and may potentially, provide a new beam index or other indication of a selected candidate beam. The BFRQ may be transmitted in a BWP that is different than the active BWP. The BFRQ may encompass one or more transmissions that include the indication of the beam failure or selected candidate beam.

The BFR 300 may further include, at 324, the base station 108 sending a BFRR to the UE 104. The BFRR may be transmitted in a BWP that is different than the active BWP.

BWP may be different from both the initial BWP and the active BWP. For example, the BWP may be the default BWP or a different BWP. In option 3, the CBD RS may be transmitted in a plurality of BWPs within the cell.

In options 1-3, if the CBD RS is in a BWP different from the active BWP, the UE 104 may switch to the BWP having the CBD RS for the CBD operation after the UE 104 declares beam failure. This BWP may be referred to as the candidate beam (CB) BWP. Consider, for example, a scenario in which the UE 104 is configured with BWPs 1-4, BWP 1 is active, and the UE 104 is using beam 1. The UE 104 may receive the BFD RS in BWP 1 on beam 1. When the UE 104 declares a beam failure it may switch to the CB BWP to measure the CBD RS. The CB BWP may be the initial BWP (option 1), a designated BWP (option 2), or one of a plurality of designated BWPs (option 3). The particular BWP of the plurality of designed BWPs chosen as the CB BWP in option 3 may be based on the discretion of the UE 104.

The UE 104 may attempt to detect the CBD RS in the CB BWP within a time window. The time window may be predefined by, for example, a 3GPP technical specification, or may be configured by RRC signaling from the base station 108. If the UE 104 cannot detect the CBD RS, the UE 104 may fall back to the initial BWP and trigger a contention-based random-access (CBRA) procedure. The CBRA procedure may be performed with respect to an SSB received in the initial BWP. After the CBRA procedure, the UE 104 may communicate with the base station 108 or APs 112/116 in the initial BWP based on a beam corresponding to the received SSB.

In some embodiments, the UE 104 may be configured with the designated CB BWP for option 2 or plurality of designated BWPs for option 3 through one or more RRC configuration parameters. For example, a beam failure reconfiguration information element (IE) may be defined as follows.

```
BeamFailureRecoveryConfig ::=        SEQUENCE {
    rootSequenceIndex-BFR              INTEGER (0..137)       OPTIONAL, --Need M
    rach-ConfigBFR                     RACH-ConfigGeneric OPTIONAL, --Need M
    rsrp-ThresholdSSB                     RSRP-Range  OPTIONAL, --Need M
    candidateBeamRSList                SEQUENCE (SIZE
                                   (1..maxNrofCandidateBeams)) OF PRACH-ResourceDedicated
                                   BFR                         OPTIONAL, --Need M
    ...
}
PRACH-ResourceDedicatedBFR ::=       CHOICE {
    ssb                                  BFR-SSB-Resource,
    csi-RS                               BFR-CSIRS-Resource,
    bwp-Id                               BWP-Id
}
BFR-SSB-Resource ::=                 SEQUENCE {
    ssb                                  SSB-Index,
    ra-PreambleIndex                     INTEGER (0..63),
    ...
}
BFR-CSIRS-Resource ::=               SEQUENCE {
    csi-RS                               NZP-CSI-RS-ResourceID,
    ra-OccasionList                      SEQUENCE (SIZE(1..maxRA-OccasionsPerCSIRS)) OF
                                   INTEGER (0..maxRA-Occasions-1) OPTIONAL, --Need R
    ra-PreambleIndex                   INTEGER (0..63)
    ...
}
```

In some embodiments, the CBD-RS may be transmitted by the base station 108 according to any of a variety of options. In option 1, all the CBD RSs may be transmitted in the initial BWP, for example, BWP 0. In option 2, the CBD RSs may be transmitted in one BWP within the cell. This The beam failure recovery configuration IE above may include control signaling that provides the BWP identifier (ID) to allow the UE 104 to identify the CB BWP and the CBD RS (SSB or CSI-RS). This configuration parameter may be used for option 2 or option 3 for primary serving cell BFR. The BWP ID may be included in the parameter that configures a PRACH resource dedicated for BFR. In this manner, the CB BWP may be associated with the dedicated resource (for example, PRACH preamble). The UE 104 may then use the dedicated resource (for example, by transmitting a PRACH preamble) to provide the base station 108 with an indication of the selected candidate beam.

Control signaling for option 2 or option 3 for secondary serving cell BFR may be provided by the beam failure recovery Scell configuration IE as defined below.

```
BeamFailureRecoverySCellConfig ::= SEQUENCE {
    rsrp-ThresholdBFR           RSRP-Range              OPTIONAL, --Need M
    candidateBeamRSSCellList    SEQUENCE (SIZE (1..maxNrofCandidateBeams))
                                OF CandidateBeamRS      OPTIONAL, --Need M
    ...
}
CandidateBeamRS ::=             SEQUENCE {
    candidateBeamConfig             CHOICE {
        ssb                             SSB-Index,
        csi-RS                          NZP-CSI-RS-ResourceID,
    },
    servingCellId                   ServCellIndex OPTIONAL --Need R
    bwp-Id                          BWP-Id
}
```

The BFR configuration provides an indication, for each candidate beam configuration, of a BWP (by provision of the BWP ID) in which the corresponding candidate beam is transmitted. Thus, by this configuration, the UE 104 will be able to identify the CB BWP. Because the BFRQ with respect to the secondary serving cell may be transmitted by a primary serving cell, the BFR configuration for the secondary serving cell may not need the PRACH configuration information.

In some embodiments, for primary serving cell BFR, the BFRQ may be transmitted in a BWP other than the current active BWP and may be carried by a contention free PRACH (CF-PRACH). This may be done by one of two options.

In a first option, a BFRQ corresponding to a primary serving cell BFR may only be transmitted in the initial BWP. For example, if the UE 104 detects a beam failure in BWP 1 on beam 1, the UE 104 may detect the CBD in a CB BWP and transmit the BFRQ in a CF-PRACH transmitted in BWP 0. In this embodiment, the CB BWP may be BWP 0 or another configured BWP other than the active BWP 1 (for example, BWP 2, 3, or 4).

In a second option, the BFRQ corresponding to a primary serving cell BFR may be transmitted in the BWP associated with the newly identified beam. For example, consider that the UE 104 detects a beam failure in BWP 1 on beam 1, and then, through CBD, selects CSI-RS x that is associated with a CF-PRACH resource y in BWP 2. This association may be provided by the PRACH-ResourceDedicatedBFR provided above in accordance with some embodiments. The UE 104 may then transmit the CF-PRACH resource y in BWP 2 as the BFRQ. Upon receiving the CF-PRACH resource y, the base station 108 will know that the UE 104 selected the CSI-RS x as the candidate beam.

If no CF-PRACH is configured, the UE 104 may fall back to CBRA, which may be transmitted in the initial BWP (BWP 0). The UE 104 may use the CBRA to request an uplink resource that, when granted, may be used to transmit the BFRQ with an indication of the selected candidate beam (for example, CSI-RS x).

For secondary serving cell BFR, the BFRQ may be transmitted in a BWP other than the current active BWP.

Some embodiments may include a two-step BFRQ report for secondary serving cell BFR. A first step may include transmitting a dedicated scheduling request (SR) to request uplink resources. The second step may include transmitting a BFR MAC CE to report a failed component carrier (CC) index or a candidate beam index.

In a first option of the two-step BFRQ report for secondary serving cell BFR, the SR and the BFR MAC CE may be transmitted in the initial BWP in a current serving cell. Thus, the UE 104 may send the SR in BWP 0 of the secondary serving cell in which the beam failure was detected. The base station 108 may then schedule the uplink resources for the BFR MAC CE in the same BWP 0 of the secondary serving cell.

In a second option of the two-step BFRQ report, the SR may be transmitted in a BWP of the current serving cell other than the active BWP or the initial BWP of the current serving cell. For example, if the UE 104 detects failure of beam 1 in BWP 1 of the secondary serving cell, the UE 104 may send an SR in BWP 2 of the secondary serving cell or some other BWP configured by RRC in the secondary serving cell for SR reporting.

In some embodiments, the base station 108 may configure one BFR-SR in each BWP of a current serving cell for the UE 104. In this situation, the candidate beam is based on the beam for the SR. Transmission of the SR may be sufficient to provide the base station 108 with information related to the selected candidate beam. No MAC CE may be needed. Thus, this variation of the second option of the secondary serving cell BFRQ report may be considered a one-step BFRQ report. However, in some embodiments, a MAC CE may be separately reported to provide information related to the failed CC index.

In a third option of the two-step BFRQ report, the SR may be transmitted in a serving cell other than the current serving cell. The SR may be transmitted in any BWP of the other serving cell, for example, an active BWP, an initial BWP, or a BWP designated by RRC for BFR SR. For example, if the UE 104 detects failure beam 1 in BWP 1 of the secondary serving cell, the SR may be transmitted in an active, initial, or designated BWP of a primary serving cell.

In both the second and third options of the two-step BFRQ report, the BFR MAC CE may be transmitted in any BWP in any serving cell.

If the SR is not configured, the UE may fall back to the initial BWP and trigger a CBRA procedure corresponding to an SSB. The MAC CE may be reported in an uplink resource allocated as a result of the CBRA procedure.

The base station 108 may transmit the BFRR by a PDCCH as described below with respect to various embodiments.

For primary serving cell BFR and secondary serving cell BFRQ option two (in which the SR is reported in BWP of current serving cell other than initial/active BWP), the BFRR may be carried by a PDCCH in a dedicated CORESET configured by RRC. This may be accomplished according to one of two options.

In a first option, the dedicated CORESET may be in the same BWP as the BFRQ.

In a second option, the dedicated CORESET may always be in the initial BWP. If the BFRQ is not transmitted in the initial BWP, a guard period may be reserved for the UE 104 to switch to the initial BWP after the UE 104 transmits the BFRQ. The guard period may be predefined (for example, 2 ms), configured by RRC signaling, or reported by UE capability signaling.

For secondary serving cell BFRQ option 1 (SR and BFR MAC CE transmitting in initial BWP of current serving cell) and 3 (SR reported in any BWP of different serving cell), the BFRR may be carried by a PDCCH that schedules a new transmission with the same HARQ process ID as the PUSCH used to carry the BFR MAC CE. Consider, for example, that the PUSCH used to carry the BFR MAC CE includes a HARQ process x. The BFRR may then be carried by a PDCCH that schedules a new transmission (for example, PDSCH) with HARQ process x. Scheduling a new transmission with the same HARQ process may provide an indication to the UE 104 that the base station 108 correctly decoded the PUSCH and, therefore, the UE 104 may clear its retransmission buffer and allocate a new transport block.

In some embodiments, the base station 108 may transmit the BFRR in the same bandwidth part in which the BFR MAC CE was received.

Figure 4:
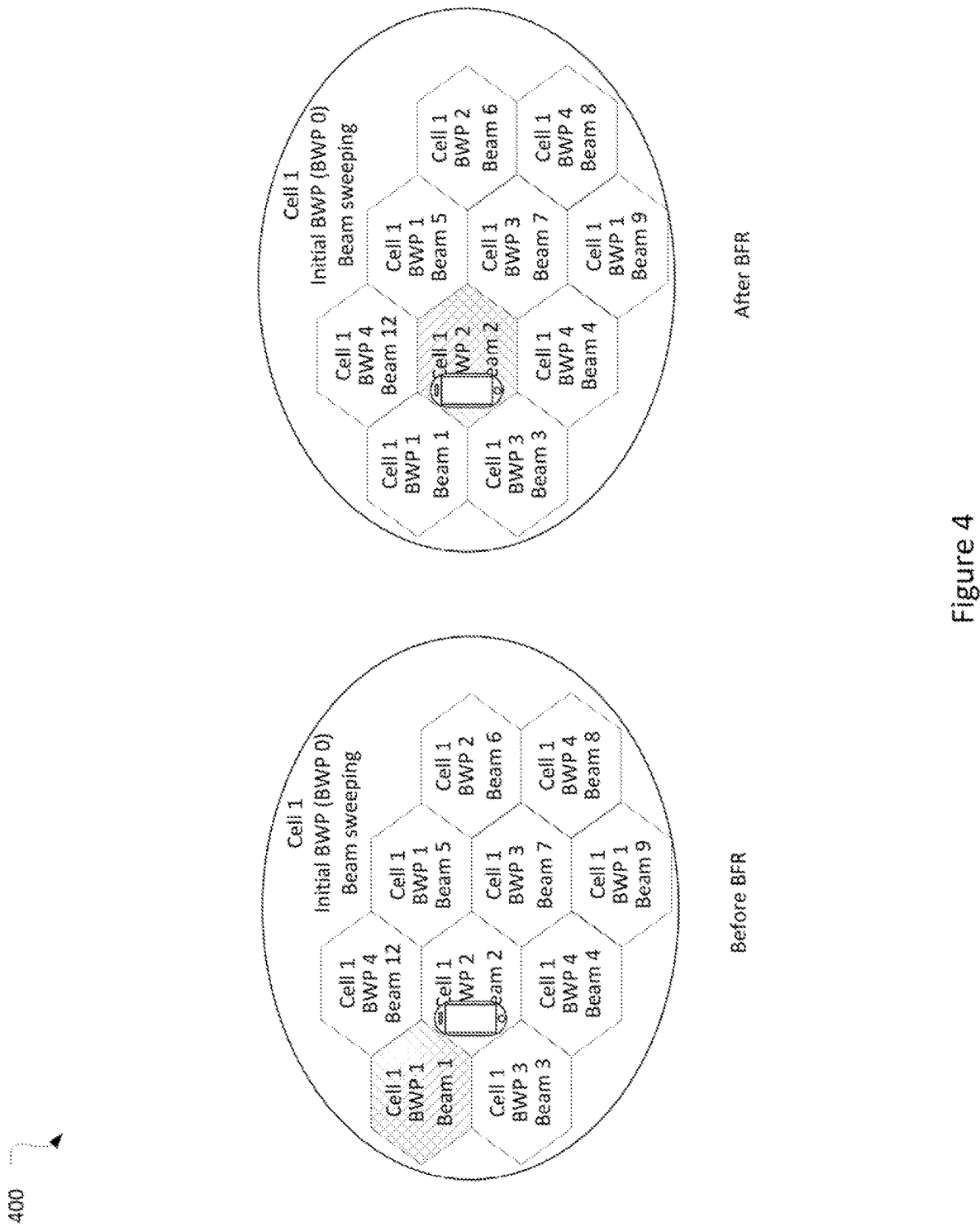
FIG. 4 illustrates the plan view of cell coverage before and after a beam failure recovery operation in accordance with some embodiments.

FIG. 4 illustrates the plan view of cell coverage 200 before and after a BFR operation in accordance with some embodiments. In this embodiment, the UE 104 may initially be connected with cell 1 through BWP 1 and beam 1. The active BWP is shown by cross-hatching in FIG. 4. The UE 104 may declare a beam failure with respect to beam 1 and may further select beam 2 of BWP 2 as the candidate beam. This may be due to the position of the UE 104 in the region that is associated with beam 2 and BWP 2. The UE 104 may send a BFRQ to the base station 108 indicating the beam failure and candidate beam selection and may receive a BFRR as described herein.

The UE 104 may start to communicate with the base station 108 with the newly identified beam (for example, beam 2) a predetermined number of slots after the UE 104 receives the BFRR. In various embodiments, the UE 104 may use the newly identified beam in various BWPs.

In a first option, the UE 104 starts to communicate with the base station 108 with the newly identified beam reported by BFRQ in the BWP associated with the newly identified beam. Thus, in the example described above, the UE 104 may communicate with the base station 108 using beam 2 in BWP 2. This option is shown in FIG. 4 by indication of the BWP 2 becoming the active BWP after the BFR operation.

In a second option, the UE 104 starts to communicate with the base station 108 with the newly identified beam reported by BFRQ in the initial BWP. Thus, in the example described above, the UE 104 may communicate with the base station 108 using beam 2 in BWP 0.

In a third option, the UE 104 starts to communicate with the base station 108 with the newly identified beam reported by BFRQ in the BWP used for BFRQ/BFRR. Consider, for example, that the BFRQ and the BFRR are transmitted in BWP 4, which was configured by RRC specifically for this type of BFR signaling. In this embodiment, the UE may communicate with the base station 108 using beam 2 in BWP 4.

The predetermined number of slots after which the UE 104 may communicate with the base station 108 using the newly identified beam may be determined in any of a number of ways. For example, the predetermined number may be predefined by 3GPP technical specification, configured by higher-layer signaling (for example, RRC layer), or reported by UE capability signaling.

Figure 5:
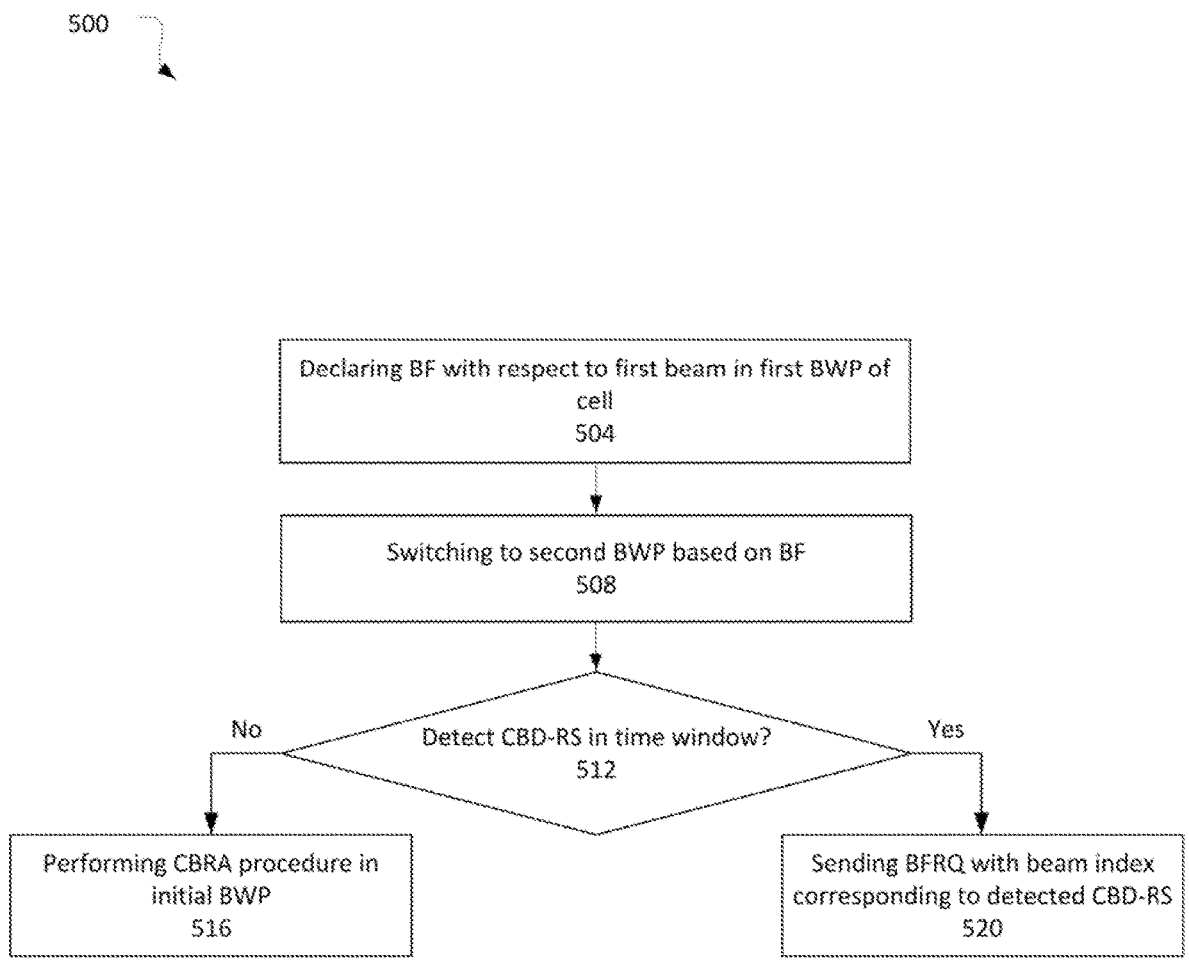
FIG. 5 illustrates an operational flow/algorithmic structure in accordance with some embodiments.

FIG. 5 illustrates an operation flow/algorithmic structure 500 in accordance with some embodiments. The operation flow/algorithmic structure 500 may be performed or implemented by a UE such as, for example, UE 104 or UE 900; or components thereof, for example, baseband processor 904A.

The operation flow/algorithmic structure 500 may include, at 504, declaring a beam failure with respect to a first beam in a first BWP of a cell. The cell may be a primary serving cell or a secondary serving cell. The beam failure may be triggered by a MAC layer of the UE 104 based on a number of beam failure instances received from a physical layer of the UE 104.

The operation flow/algorithmic structure 500 may further include, at 508, switching to a second BWP (for example, a CB BWP) based on the beam failure. In various embodiments, the second BWP may be an initial BWP, a default BWP, or another BWP designated for transmission of CBD-RSs. Designation of one or more BWPs for transmitting the CBD RSs may be done through a BFR configuration IE transmitted to the UE by the network.

In some embodiments, a BWP that is configured to transmit the CBD RS may be exclusively configured to do so. For example, in these embodiments the network may designate only one BWP within a cell for transmission of CBD RSs. This may be the initial BWP, a default BWP, or another BWP. This designation, and any modification thereto, may be configured to the UEs connected to a cell through higher-layer signaling such as, for example, RRC signaling. In other embodiments, a plurality of BWPs may be simultaneously configured to transmit CBD RSs.

The operation flow/algorithmic structure 500 may further include, at 512, attempting to detect a CBD-RS in a time window. The time window may be predefined by 3GPP technical specification or configured by RRC. The CBD-RS may be transmitted (by the base station 108, AP 112, or AP 116) with a number of different beams in the CB BWP. The UE may detect the CBD RS if measurements of the CBD RS, taken within the time window, are greater than or equal to a predetermined threshold.

If, at 512, a CBD-RS is not detected, the operation flow/algorithmic structure 500 may advance to performing a CBRA procedure in an initial BWP. The CBRA procedure may be based on an SSB transmitted in the initial BWP. After completing the CBRA procedure, the UE may reestablish a connection with the network.

If, at 512, a CBD-RS is detected, the operation flow/algorithmic structure 500 may advance to sending a BFRQ with a beam index of a beam that corresponds to the detected CBD-RS. In this manner, the UE may communicate, to the network, its selection of a desired candidate beam for further communications.

Figure 6:
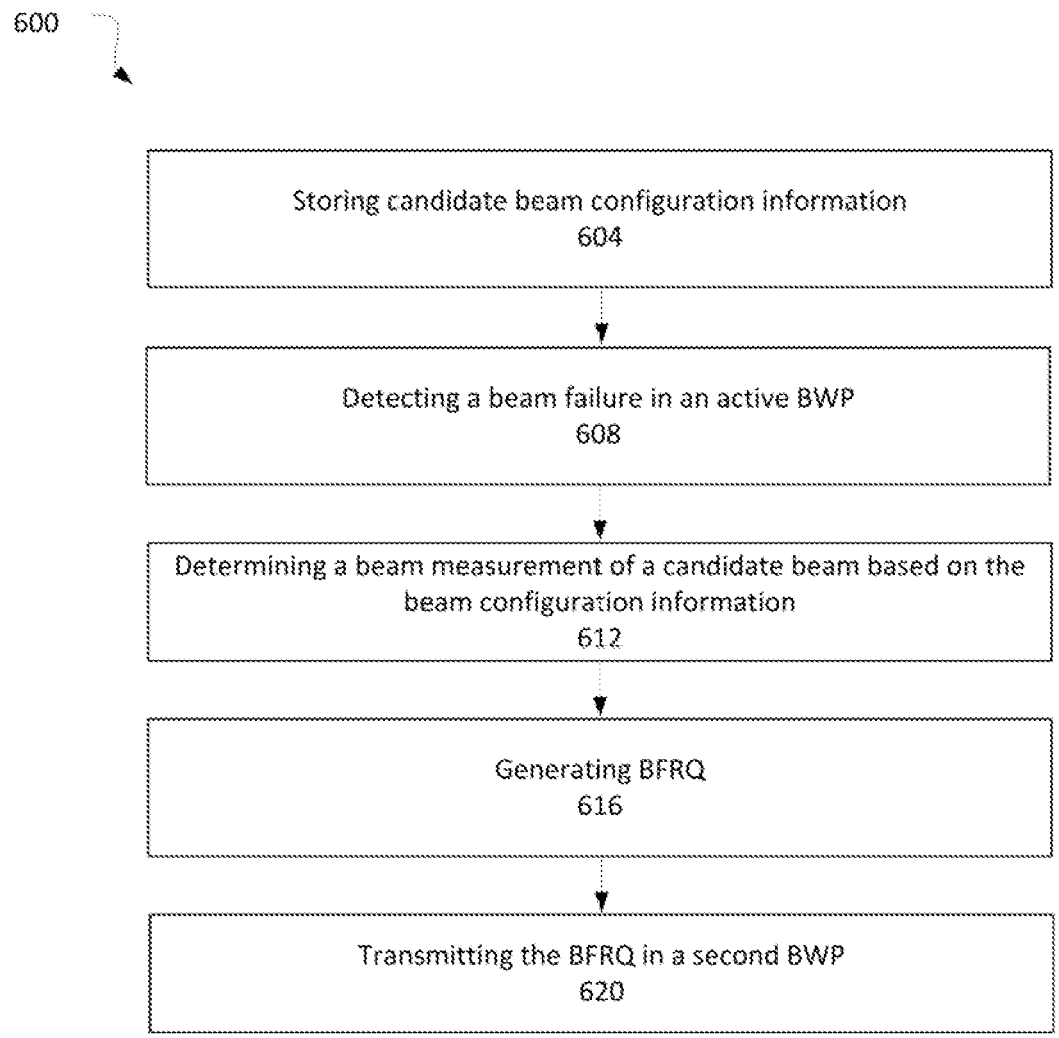
FIG. 6 illustrates another operational flow/algorithmic structure in accordance with some embodiments.

FIG. 6 illustrates an operation flow/algorithmic structure 600 in accordance with some embodiments. The operation flow/algorithmic structure 600 may be performed or implemented by a UE such as, for example, UE 104 or UE 900; or components thereof, for example, baseband processor 904A.

The operation flow/algorithmic structure 600 may include, at 604, storing candidate beam configuration information. The candidate beam configuration information may configure one or more reference signals to be used as a CBD RS. The reference signals may include SSB or CSI-RS signals. The candidate beam configuration information may further configure one or more BWPs for the CBD RS (for example, one or more CB BWPs). The CB BWPs may be BWPs other than the active BWP.

The candidate beam configuration information may be UE-specific or cell-specific configuration information.

The operation flow/algorithmic structure 600 may further include, at 608, detecting a beam failure in an active BWP. The beam failure may be detected as described elsewhere herein.

The operation flow/algorithmic structure 600 may further include, at 612, determining a beam measurement of a candidate beam based on the beam configuration information. The UE may switch to the CB BWP in order to measure the CBD RS as configured by the beam configuration information. In some embodiments, the UE may measure the CBD RS as transmitted by a plurality of candidate beams. The UE may select one candidate beam from the plurality of candidate beams based on the measurements.

The operation flow/algorithmic structure 600 may further include, at 616, generating a BFRQ. The BFRQ may be generated in a manner to provide the network with information as to which candidate beam was selected by the UE. In some embodiments, the BFRQ may be a CF-PRACH or SR that is associated with the selected candidate beam. In other embodiments, the BFRQ may include a BFR MAC CE that includes an indication of an index of the candidate beam. In some embodiments, the BFR MAC CE may also provide an index of a failed beam.

The operation flow/algorithmic structure 600 may further include, at 620, transmitting the BFRQ in a second BWP. In some embodiments, the second BWP may be a BWP other than the active BWP in the serving cell having the failed beam. In some embodiments, the second BWP may be an initial/default/configured BWP of the serving cell. In other embodiments, the second BWP may be any BWP in a serving cell other than the serving cell having the failed beam. For example, if a beam of the secondary serving cell fails, the BFRQ may be transmitted in an initial/default/configured BWP of a primary serving cell.

The transmission of the BFRQ may include sending CF-PRACH transmission or an SR when configured in a manner to associate the SR with a particular beam/BWP. Alternatively, the transmission of the BFRQ may include obtaining an uplink resource by sending a dedicated SR or performing a CBRA procedure, and sending the BFR MAC CE in the uplink resource.

Figure 7:
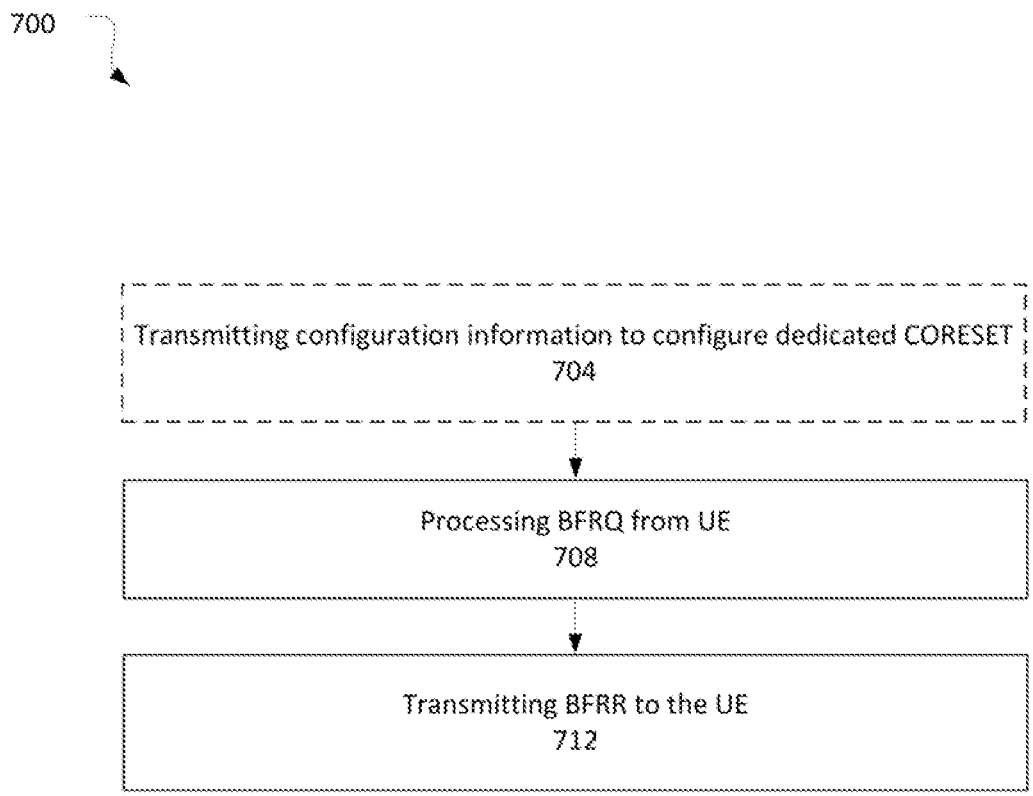
FIG. 7 illustrates another operational flow/algorithmic structure in accordance with some embodiments.

FIG. 7 may include an operation flow/algorithmic structure 700 in accordance with some embodiments. The operation flow/algorithmic structure 700 may be performed or implemented by a base station such as, for example, base station 108 or 1000; or components thereof, for example, baseband processor 1004A.

The operation flow/algorithmic structure 700 may include, at 704, transmitting configuration information to configure a dedicated CORESET. The CORESET may define various physical layer characteristics (for example, a set of resource blocks and number of symbols available to a search space set) that are dedicated to PDCCH transmissions that are used in BFR operations. In some embodiments, the operation of 704 may be optional.

The operation flow/algorithmic structure 700 may further include, at 708, processing BFRQ received from a UE. The BFRQ may provide an indication of a candidate beam selected by a UE during a BFR operation. The BFRQ may be a CF-PRACH or SR associated with the selected candidate beam, or a BFR MAC CE that indicates a candidate beam index of the selected candidate beam.

The operation flow/algorithmic structure 700 may further include, at 712, transmitting the BFRR to the UE. The BFRR may indicate, to the UE, that the BFR operation is successful in the UE may proceed to communicate with the network using the selected candidate beam.

In some embodiments, the BFRQ and the BFRR may be transmitted in the same bandwidth part. In other embodiments, they may be transmitted in different bandwidth parts. For example, in some embodiments the BFRR may be transmitted in an initial bandwidth part, while the BFRQ is transmitted in another bandwidth part.

In some embodiments, the BFRR may be transmitted in a PDCCH transmission in the CORESET dedicated to BFR. In other embodiments, the BFRR may be transmitted in a PDCCH transmission that schedules a transmission with the same HARQ process identifier included in a PUSCH transmission that carried the BFRQ.

Figure 8:
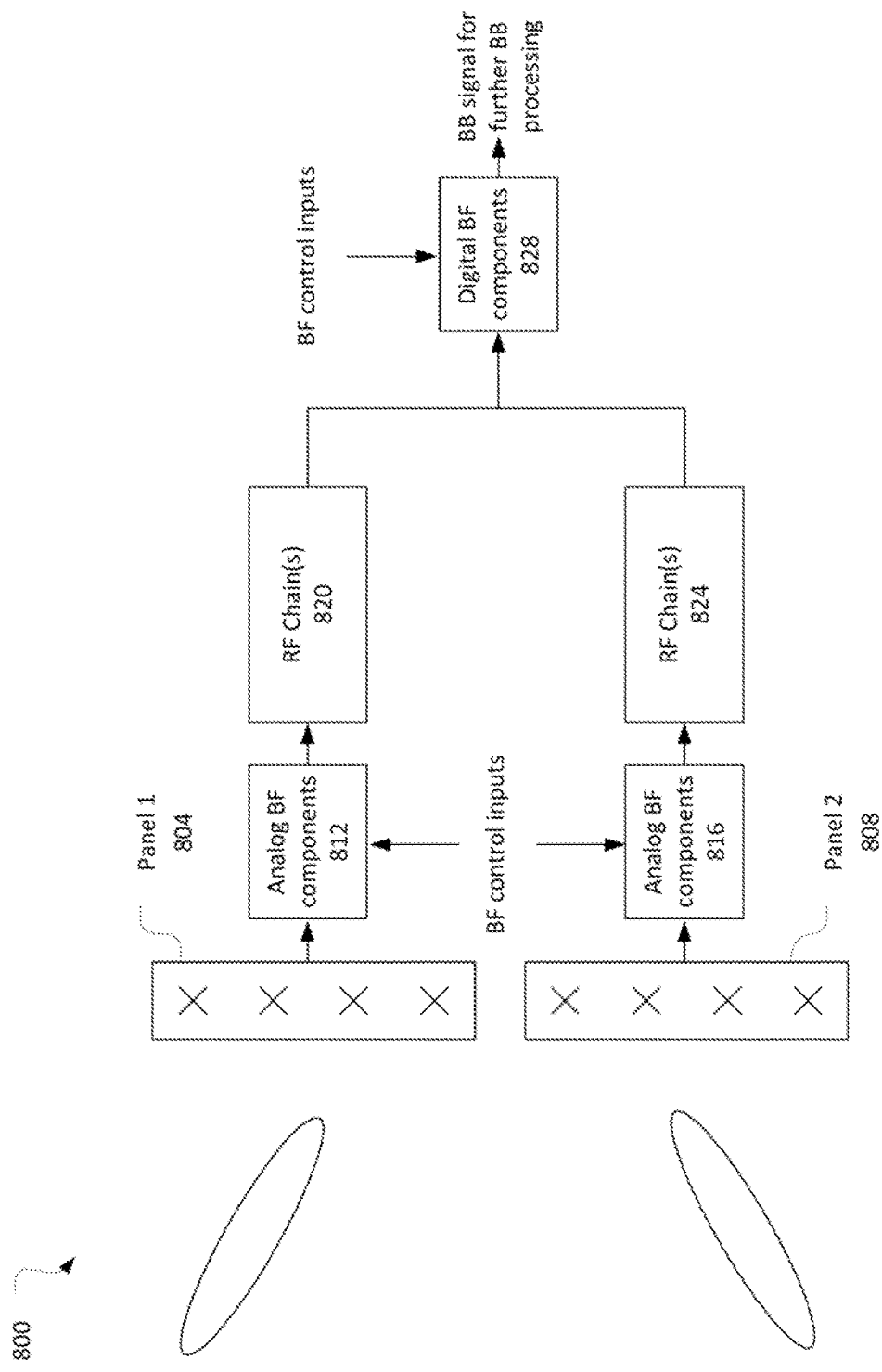
FIG. 8 illustrates beamforming components of a device in accordance with some embodiments.

FIG. 8 illustrates receive components 800 of a device in accordance with some embodiments. The device may be the UE 104, base station 108, AP 112, or AP 116. The receive components 800 may include a first antenna panel, panel 1 804, and a second antenna panel, panel 2 808. Each antenna panel may include a number of antenna elements.

The antenna panels may be coupled to respective analog beamforming (BF) components. For example, panel 1 804 may be coupled with analog BF components 812 and panel 2 808 may be coupled with analog BF components 816.

The analog BF components may be coupled with one or more radio-frequency (RF) chains. For example, analog BF components 812 may be coupled with one or more RF chains 820 and analog BF components 816 may be coupled with one or more RF chains 824. The RF chains may amplify a receive analog RF signal, downconvert the RF signal to baseband, and convert the analog baseband signal to a digital baseband signal, which may be provided to digital BF components 828. The digital BF components 828 may provide a baseband (BB signal) for further BB processing.

In various embodiments, control circuitry, which may reside in a baseband processor, may provide BF weights to the analog/digital BF components to provide a receive beam at respective antenna panels. These BF weights may be determined by the control circuitry based on received reference signals and corresponding QCL/TCI information as described herein. In some embodiments, the BF weights may be phase-shift values provided to phase shifters of the analog BF components 812 or complex weights provided to the digital BF components 828. In some embodiments, the BF components and antenna panels may operate together to provide a dynamic phased-array that is capable of directing the beams in the desired direction.

In various embodiments, beamforming may include analog, only digital, or a hybrid analog-digital beamforming. Digital beamforming may utilize separate RF chains that respectively correspond to the antenna elements.

While the beamforming components 800 describe receive beamforming, other embodiments may include beamforming components that perform transmit beamforming in analogous manners.

Figure 9:
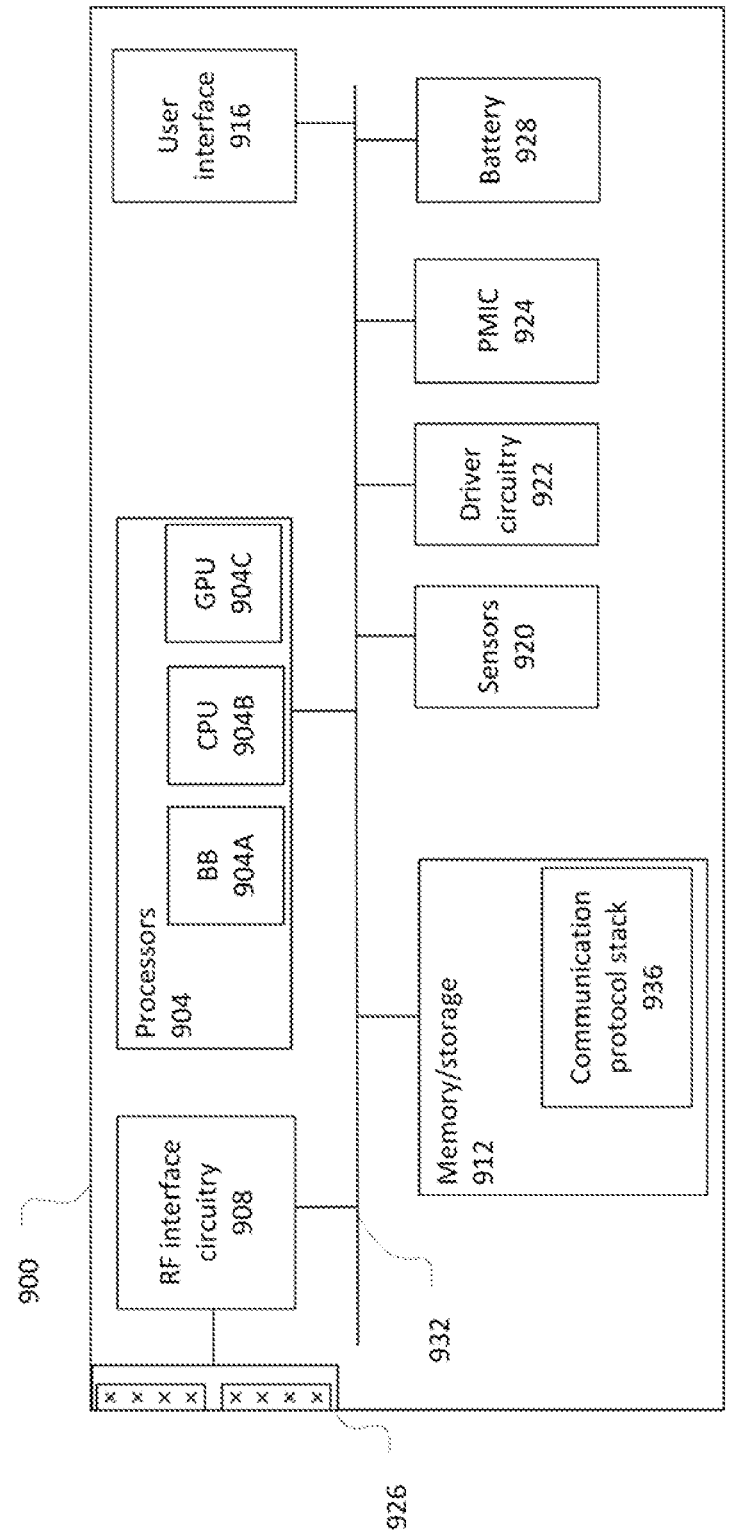
FIG. 9 illustrates a user equipment in accordance with some embodiments.

FIG. 9 illustrates a UE 900 in accordance with some embodiments. The UE 900 may be similar to and substantially interchangeable with UE 104 of FIG. 1.

The UE 900 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 900 may include processors 904, RF interface circuitry 908, memory/storage 912, user interface 916, sensors 920, driver circuitry 922, power management integrated circuit (PMIC) 924, antenna structure 926, and battery 928. The components of the UE 900 may be implemented as integrated circuits (ICs), portions thereof, discrete electronic devices, or other modules, logic, hardware, software, firmware, or a combination thereof. The block diagram of FIG. 9 is intended to show a high-level view of some of the components of the UE 900. However, some of the components shown may be omitted, additional components may be present, and different arrangement of the components shown may occur in other implementations.

The components of the UE 900 may be coupled with various other components over one or more interconnects 932, which may represent any type of interface, input/output, bus (local, system, or expansion), transmission line, trace, optical connection, etc. that allows various circuit components (on common or different chips or chipsets) to interact with one another.

The processors 904 may include processor circuitry such as, for example, baseband processor circuitry (BB) 904A, central processor unit circuitry (CPU) 904B, and graphics processor unit circuitry (GPU) 904C. The processors 904 may include any type of circuitry or processor circuitry that executes or otherwise operates computer-executable instructions, such as program code, software modules, or functional processes from memory/storage 912 to cause the UE 900 to perform operations as described herein.

In some embodiments, the baseband processor circuitry 904A may access a communication protocol stack 936 in the memory/storage 912 to communicate over a 3GPP compatible network. In general, the baseband processor circuitry 904A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 908.

The baseband processor circuitry 904A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 912 may include one or more non-transitory, computer-readable media that includes instructions (for example, communication protocol stack 936) that may be executed by one or more of the processors 904 to cause the UE 900 to perform various operations described herein. The memory/storage 912 include any type of volatile or non-volatile memory that may be distributed throughout the UE 900. In some embodiments, some of the memory/storage 912 may be located on the processors 904 themselves (for example, L1 and L2 cache), while other memory/storage 912 is external to the processors 904 but accessible thereto via a memory interface. The memory/storage 912 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 908 may include transceiver circuitry and radio frequency front module (RFEM) that allows the UE 900 to communicate with other devices over a radio access network. The RF interface circuitry 908 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 926 and proceed to filter and amplify (with a low-noise amplifier) the signal. The signal may be provided to a receiver of the transceiver that down-converts the RF signal into a baseband signal that is provided to the baseband processor of the processors 904.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 926.

In various embodiments, the RF interface circuitry 908 may be configured to transmit/receive signals in a manner compatible with NR access technologies.

The antenna 926 may include antenna elements to convert electrical signals into radio waves to travel through the air and to convert received radio waves into electrical signals. The antenna elements may be arranged into one or more antenna panels. The antenna 926 may have antenna panels that are omnidirectional, directional, or a combination thereof to enable beamforming and multiple input, multiple output communications. The antenna 926 may include microstrip antennas, printed antennas fabricated on the surface of one or more printed circuit boards, patch antennas, phased array antennas, etc. The antenna 926 may have one or more panels designed for specific frequency bands including bands in FR1 or FR2.

The user interface circuitry 916 includes various input/output (I/O) devices designed to enable user interaction with the UE 900. The user interface 916 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1100.

The sensors 920 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 922 may include software and hardware elements that operate to control particular devices that are embedded in the UE 900, attached to the UE 1100, or otherwise communicatively coupled with the UE 900. The driver circuitry 922 may include individual drivers allowing other components to interact with or control various input/output (I/O) devices that may be present within, or connected to, the UE 900. For example, driver circuitry 922 may include a display driver to control and allow access to a display device, a touchscreen driver to control and allow access to a touchscreen interface, sensor drivers to obtain sensor readings of sensor circuitry 920 and control and allow access to sensor circuitry 920, drivers to obtain actuator positions of electro-mechanic components or control and allow access to the electro-mechanic components, a camera driver to control and allow access to an embedded image capture device, audio drivers to control and allow access to one or more audio devices.

The PMIC 924 may manage power provided to various components of the UE 900. In particular, with respect to the processors 904, the PMIC 924 may control power-source selection, voltage scaling, battery charging, or DC-to-DC conversion.

In some embodiments, the PMIC 924 may control, or otherwise be part of, various power saving mechanisms of the UE 900 including DRX as discussed herein.

A battery 928 may power the UE 900, although in some examples the UE 900 may be mounted deployed in a fixed location, and may have a power supply coupled to an electrical grid. The battery 928 may be a lithium ion battery, a metal-air battery, such as a zinc-air battery, an aluminum-air battery, a lithium-air battery, and the like. In some implementations, such as in vehicle-based applications, the battery 928 may be a typical lead-acid automotive battery.

Figure 10:
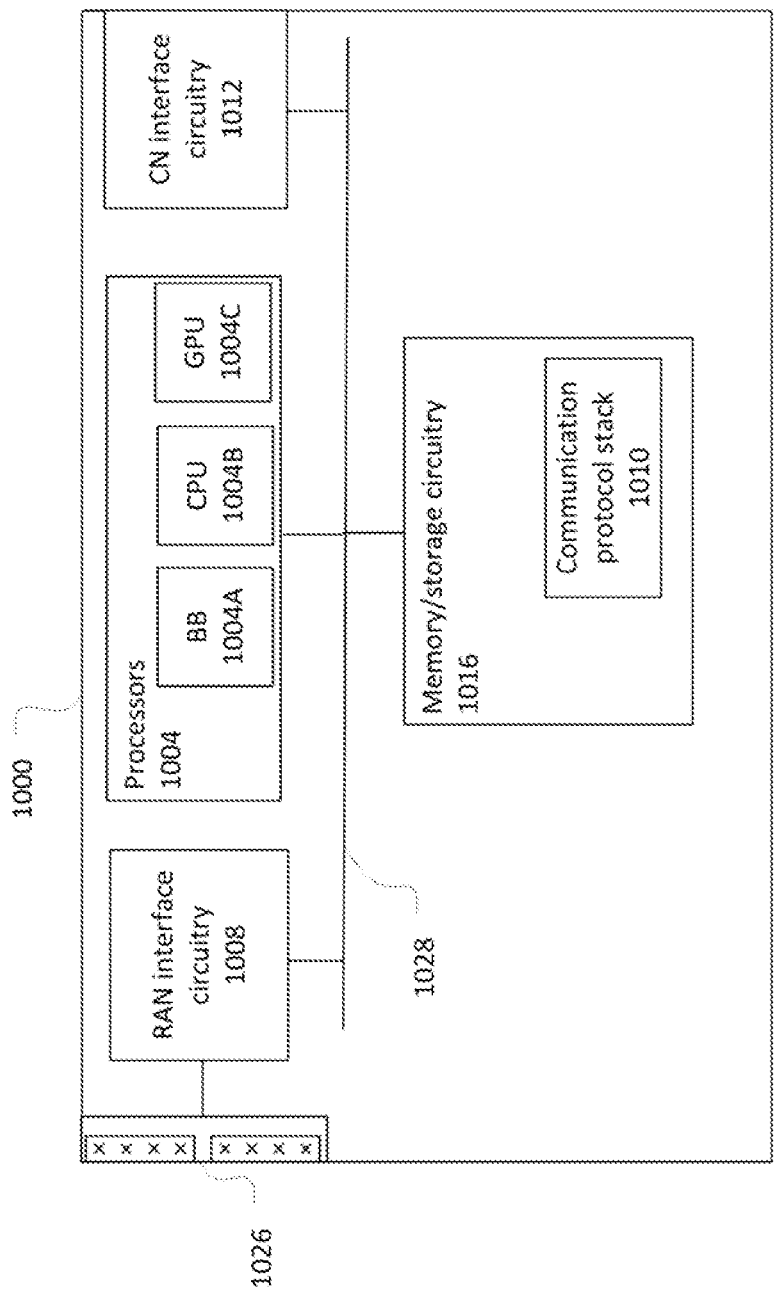
FIG. 10 illustrates a base station in accordance with some embodiments.

FIG. 10 illustrates a gNB 1000 in accordance with some embodiments. The gNB node 1000 may similar to and substantially interchangeable with base station 108 of FIG. 1.

The gNB 1000 may include processors 1004, RF interface circuitry 1008, core network "CN" interface circuitry 1012, memory/storage circuitry 1016, and antenna structure 1026.

The components of the gNB 1000 may be coupled with various other components over one or more interconnects 1028.

The processors 1004, RF interface circuitry 1008, memory/storage circuitry 1016 (including communication protocol stack 1010), antenna structure 1026, and interconnects 1028 may be similar to like-named elements shown and described with respect to FIG. 9.

The CN interface circuitry 1012 may provide connectivity to a core network, for example, a 5th Generation Core network "5GC" using a 5GC-compatible network interface protocol such as carrier Ethernet protocols, or some other suitable protocol. Network connectivity may be provided to/from the gNB 1000 via a fiber optic or wireless backhaul. The CN interface circuitry 1012 may include one or more dedicated processors or FPGAs to communicate using one or more of the aforementioned protocols. In some implementations, the CN interface circuitry 1012 may include multiple controllers to provide connectivity to other networks using the same or different protocols.

In some embodiments, the gNB 1000 may be coupled with APs, such as APs 112 or 116, using the antenna structure 1026, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method comprising: declaring a beam failure with respect to a first beam in a first bandwidth part of a cell; switching to a second bandwidth part of the cell based on the beam failure; and attempting to detect a candidate beam detection (CBD) reference signal (RS) of a second beam in the second bandwidth part.

Example 2 includes the method of example 1 or some other example herein, wherein the second bandwidth part is an initial bandwidth part of the cell.

Example 3 includes the method of example 1 or some other example herein, further comprising receiving beam failure recovery configuration information to exclusively configure the second bandwidth part for transmission of reference signals for candidate beam detection.

Example 4 includes the method of example 1 or some other example herein, further comprising receiving beam failure recovery configuration information to configure a plurality of CBD RSs in a corresponding plurality of bandwidth parts in the cell, wherein the CBD RS is one of the plurality of CBD RSs.

Example 5 includes the method of example 3 or example 4 or some other example herein, wherein receiving the beam failure recovery configuration information comprises processing: a beam failure recovery (BFR) configuration information element to detect a BFR-dedicated physical random access channel (PRACH) resource parameter having one or more bandwidth part identifiers; or a BFR secondary cell configuration information element to detect a candidate beam reference signal parameter having one or more bandwidth part identifiers.

Example 6 includes the method of example 1 or some other example herein, further comprising determining the CBD RS is not detectable within a time window that is predefined or configured by radio resource control signaling; and triggering a contention-based random access (CBRA) procedure corresponding to a synchronization signal block within an initial bandwidth part of the cell.

Example 7 includes the method of example 6 or some other example herein, further comprising: initiating communication with a transmit-receive point in the initial bandwidth part based on a beam associated with the synchronization signal block.

Example 8 includes the method of example 1 or some other example herein, further comprising: successfully detecting the CBD-RS of the second beam in the second bandwidth part; and sending, to a base station based on successful detection of the CBD-RS of the second beam, a beam failure recovery request with a beam index corresponding to the second beam.

Example 9 includes the method comprising: storing candidate beam configuration information; detecting a beam failure in an active bandwidth part (BWP) of a cell; determining a beam measurement of a candidate beam based on the candidate beam configuration information; generating, based on the beam failure and the beam measurement, a beam failure recovery request (BFRQ); and transmitting the BFRQ in a second BWP of a cell.

Example 10 includes the method of example 9 or some other example herein, wherein the beam failure is with respect to a primary serving cell.

Example 11 includes the method of example 10 or some other example herein, wherein to transmit the BFRQ the processing circuitry is to: transmit the BFRQ in a contention-free physical random access channel.

Example 12 includes the method of example 10 or some other example herein, wherein the second BWP is an initial BWP.

Example 13 includes the method of example 12 or some other example herein, wherein transmitting the BFRQ in the initial BWP comprises: obtaining uplink resources in the initial BWP using a contention-based physical random access channel; and transmitting the BFRQ in the uplink resources.

Example 14 includes the method of example 10 or some other example herein, further comprising: receiving the candidate beam in the second BWP.

Example 15 includes the method of example 9 or some other example herein, wherein the beam failure is with respect to a secondary cell.

Example 16 includes the method of example 15 or some other example herein, wherein the BFRQ comprises a beam failure recovery (BFR) media access control (MAC) control element (CE) that includes an indication of a failed component carrier index or candidate beam index and, transmitting the BFR MAC CE comprises: transmitting a dedicated scheduling request (SR) to request uplink resources; processing a response that indicates allocation of the uplink resources; and transmitting the BFR MAC CE in the uplink resources, wherein: the second BWP is an initial BWP and the method further comprises transmitting both the BFR MAC CE and the dedicated SR in the initial BWP; or the beam failure is detected in a first serving cell and the method further comprises transmitting the dedicated SR in an active BWP, an initial BWP, or a configured BWP of a second serving cell that is different from the first serving cell.

Example 17 includes the method of example 15 or some other example herein, further comprising: processing BFR configuration information, from a base station, that configures a plurality of BFR-scheduling requests in a corresponding plurality of bandwidth parts; selecting, from the plurality of BFR-SRs, a first BFR the corresponds to a first bandwidth part in which the candidate beam is transmitted; and transmitting the first BFR-SR as the BFRQ, wherein the first bandwidth part is different from the active bandwidth part and an initial bandwidth part of the cell.

Example 18 includes the method of example 9 or some other example herein, further comprising: receiving a beam failure recovery response (BFRR) from the base station; and starting communication with the base station, a predetermined number of slots after receipt of the BFRR, using the candidate beam in an initial BWP, the second BWP, or a BWP associated with the candidate beam.

Example 19 includes a method of operating a base station, the method comprising: transmitting configuration information to configure a control resource set (CORESET) dedicated to beam failure recovery; processing a beam failure recovery request (BFRQ) from a user equipment (UE); and transmitting a beam failure recovery response (BFRR) in a physical downlink control channel (PDCCH) transmission in the CORESET dedicated to beam failure recovery.

Example 19.1 includes the method of example 19 or some other example herein, further comprising: receiving the BFRQ and transmitting the BFRR in a first bandwidth part; or receiving the BFRQ in a first bandwidth part that is different from an initial bandwidth part and transmitting the BFRR in the initial bandwidth part.

Example 20 includes a method of operating a base station, the method comprising: processing a beam failure recovery request (BFRQ) received in a physical uplink shared channel (PUSCH) transmission that includes a hybrid automatic repeat request (HARQ) process identifier; and transmitting a beam failure recovery response (BFRR) in a physical downlink control channel (PDCCH) transmission that schedules a transmission with the HARQ process identifer.

Example 20.1 includes the method of example 20 or some other example herein, further comprising: receiving the PUSCH transmission and transmitting the PDCCH transmission and a first bandwidth part.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-20, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed by one or more processors, cause a user equipment (UE) to:
   declare a beam failure with respect to a first beam in a first bandwidth part of a cell;
   switch to a second bandwidth part of the cell based on the beam failure;
   determine that a candidate beam detection (CBD) reference signal (RS) of a second beam in the second bandwidth part is not detected within a time window that is predefined or configured by radio resource control signaling; and
   trigger, based on determination that the CBD RS is not detected within the time window, a contention-based random access (CBRA) procedure corresponding to a synchronization signal block within an initial bandwidth part of the cell.

2. The one or more non-transitory computer-readable media of claim 1, wherein the second bandwidth part is the initial bandwidth part of the cell.

3. The one or more non-transitory computer-readable media of claim 1, wherein the instructions, when executed, further cause the UE to:
   receive beam failure recovery configuration information to exclusively configure the second bandwidth part for transmission of reference signals for candidate beam detection.

4. The one or more non-transitory computer-readable media of claim 3, wherein to receive the beam failure recovery configuration information the UE is to process:
   a beam failure recovery (BFR) configuration information element to detect a BFR-dedicated physical random access channel (PRACH) resource parameter having one or more bandwidth part identifiers; or
   a BFR secondary cell configuration information element to detect a candidate beam reference signal parameter having one or more bandwidth part identifiers.

5. The one or more non-transitory computer-readable media of claim 1, wherein the instructions, when executed, further cause the UE to:
   receive beam failure recovery configuration information to configure a plurality of CBD RSs in a corresponding plurality of bandwidth parts in the cell, wherein the CBD RS is one of the plurality of CBD RSs.

6. The one or more non-transitory computer-readable media of claim 5, wherein to receive the beam failure recovery configuration information the UE is to process:
   a beam failure recovery (BFR) configuration information element to detect a BFR-dedicated physical random access channel (PRACH) resource parameter having one or more bandwidth part identifiers; or
   a BFR secondary cell configuration information element to detect a candidate beam reference signal parameter having one or more bandwidth part identifiers.

7. The one or more non-transitory computer-readable media of claim 1, wherein the instructions, when executed, further cause the UE to:
   initiate communication with a transmit-receive point in the initial bandwidth part based on a beam associated with the synchronization signal block.

8. A user equipment (UE) comprising:
   radio-frequency (RF) interface circuitry to receive and transmit signals in a plurality of bandwidth parts of a cell; and
   processing circuitry coupled with the RF interface circuitry, the processing circuitry to:
      declare a beam failure with respect to a first beam in a first bandwidth part of the plurality of bandwidth parts;
      switch to a second bandwidth part of the plurality of bandwidth parts based on the beam failure;
      determine a candidate beam detection (CBD) reference signal (RS) of a second beam in the second bandwidth part is not detected within a time window that is predefined or configured by radio resource control signaling; and trigger, based on determination that the CBD RS is not detected within the time window, a contention-based random access (CBRA) procedure corresponding to a synchronization signal block within an initial bandwidth part of the cell.

9. The UE of claim 8, wherein the second bandwidth part is the initial bandwidth part of the cell.

10. The UE of claim 8, wherein the processing circuitry is further to:
receive beam failure recovery configuration information to exclusively configure the second bandwidth part for transmission of reference signals for candidate beam detection.

11. The UE of claim 10, wherein to receive the beam failure recovery configuration information the processing circuitry is to process:
a beam failure recovery (BFR) configuration information element to detect a BFR-dedicated physical random access channel (PRACH) resource parameter having one or more bandwidth part identifiers; or
a BFR secondary cell configuration information element to detect a candidate beam reference signal parameter having one or more bandwidth part identifiers.

12. The UE of claim 8, wherein the processing circuitry is further to:
receive beam failure recovery configuration information to configure a plurality of CBD RSs in a corresponding plurality of bandwidth parts in the cell, wherein the CBD RS is one of the plurality of CBD RSs.

13. The UE of claim 12, wherein to receive the beam failure recovery configuration information the processing circuitry is to process:
a beam failure recovery (BFR) configuration information element to detect a BFR-dedicated physical random access channel (PRACH) resource parameter having one or more bandwidth part identifiers; or
a BFR secondary cell configuration information element to detect a candidate beam reference signal parameter having one or more bandwidth part identifiers.

14. The UE of claim 8, wherein the processing circuitry is further to:
initiate communication with a transmit-receive point in the initial bandwidth part based on a beam associated with the synchronization signal block.

15. A method comprising:
identifying a beam failure with respect to a first beam in a first bandwidth part of a cell;
switching to a second bandwidth part of the cell based on the beam failure;
determining a candidate beam detection (CBD) reference signal (RS) of a second beam in the second bandwidth part is not detected within a time window that is predefined or configured by radio resource control signaling; and
triggering, based on said determining that the CBD RS is not detected within the time window, a contention-based random access (CBRA) procedure corresponding to a synchronization signal block within an initial bandwidth part of the cell.

16. The method of claim 15, wherein the second bandwidth part is the initial bandwidth part of the cell.

17. The method of claim 15, further comprising:
receiving beam failure recovery configuration information to exclusively configure the second bandwidth part for transmission of reference signals for candidate beam detection.

18. The method of claim 17, wherein receiving the beam failure recovery configuration information comprises processing:
a beam failure recovery (BFR) configuration information element to detect a BFR-dedicated physical random access channel (PRACH) resource parameter having one or more bandwidth part identifiers; or
a BFR secondary cell configuration information element to detect a candidate beam reference signal parameter having one or more bandwidth part identifiers.

19. The method of claim 15, further comprising:
receiving beam failure recovery configuration information to configure a plurality of CBD RSs in a corresponding plurality of bandwidth parts in the cell, wherein the CBD RS is one of the plurality of CBD RSs.

20. The method of claim 15, further comprising:
initiating communication with a transmit-receive point in the initial bandwidth part based on a beam associated with the synchronization signal block.

* * * * *